April 29, 1952 | A. H. DICKINSON | 2,594,742

TWO SOURCE BINARY-DECADE COUNTER

Filed Jan. 12, 1949 | 6 Sheets-Sheet 1

INVENTOR
ARTHUR H. DICKINSON
BY Dwight D. Mooney
AGENT

April 29, 1952 A. H. DICKINSON 2,594,742
TWO SOURCE BINARY-DECADE COUNTER
Filed Jan. 12, 1949 6 Sheets-Sheet 2

FIG. 1a.

| INPUT PULSES | TRIGGERS | | | | | TUBES | | |
|---|---|---|---|---|---|---|---|---|
| | A | B | C | D | E | 10 | 11 | 12 |
| 0 | 0 | 0 | 0 | 0 | 0 | X | 0 | 0 |
| 1 | X | 0 | 0 | 0 | 0 | X | 0 | 0 |
| 2 | 0 | X | 0 | 0 | 0 | X | 0 | 0 |
| 3 | X | X | 0 | 0 | 0 | X | 0 | 0 |
| 4 | 0 | 0 | X | 0 | X | X | 0 | 0 |
| | X | X | | | 0 | 0 | X | X |
| 5 | 0 | 0 | 0 | X | 0 | X | 0 | 0 |
| 6 | X | 0 | 0 | X | 0 | X | 0 | 0 |
| 7 | 0 | X | 0 | X | 0 | X | 0 | 0 |
| 8 | X | X | 0 | X | 0 | X | 0 | 0 |
| 9 | 0 | 0 | X | X | X | X | 0 | 0 |
| | X | X | | | 0 | 0 | X | X |
| 10 | 0 | 0 | 0 | 0 | 0 | X | 0 | 0 |

| INPUT PULSES | TRIGGERS | | | | | TUBES | | |
|---|---|---|---|---|---|---|---|---|
| | A | B | C | D | E | 10 | 11 | 12 |
| 0 | X | X | 0 | 0 | 0 | X | 0 | 0 |
| 1 | 0 | 0 | X | 0 | 0 | X | 0 | 0 |
| 2 | X | 0 | X | 0 | 0 | X | 0 | 0 |
| 3 | 0 | X | X | 0 | 0 | X | 0 | 0 |
| 4 | X | X | X | 0 | 0 | X | 0 | 0 |
| 5 | 0 | 0 | 0 | X | X | X | 0 | 0 |
| | X | X | | | 0 | 0 | X | X |
| 6 | 0 | 0 | X | X | 0 | X | 0 | 0 |
| 7 | X | 0 | X | X | 0 | X | 0 | 0 |
| 8 | 0 | X | X | X | 0 | X | 0 | 0 |
| 9 | X | X | X | X | 0 | X | 0 | 0 |
| 10 | 0 | 0 | 0 | 0 | X | X | 0 | 0 |
| | X | X | | | 0 | 0 | X | X |

FIG. 2a.

INVENTOR
ARTHUR H. DICKINSON
BY Dwight D. Mooney
AGENT

April 29, 1952 A. H. DICKINSON 2,594,742

TWO SOURCE BINARY-DECADE COUNTER

Filed Jan. 12, 1949 6 Sheets-Sheet 3

INVENTOR
ARTHUR H. DICKINSON
BY Dwight D. Mooney
AGENT

INVENTOR
ARTHUR H. DICKINSON
BY Dwight D. Mooney
AGENT

Fig-3a-

| INPUT PULSES | TRIGGERS | | | | | TUBES | | |
|---|---|---|---|---|---|---|---|---|
| | A | B | C | D | E | 10 | 11 | 12 |
| 0 | 0 | 0 | 0 | 0 | 0 | X | 0 | 0 |
| 1 | X | 0 | 0 | 0 | 0 | X | 0 | 0 |
| 2 | 0 | X | 0 | 0 | 0 | X | 0 | 0 |
| 3 | X | X | 0 | 0 | 0 | X | 0 | 0 |
| 4 | 0 | 0 | X | 0 | 0 | X | 0 | 0 |
| 5 | X | 0 | X | 0 | 0 | X | 0 | 0 |
| 6 | 0 | X | X | 0 | 0 | X | 0 | 0 |
| 7 | X | X | X | 0 | 0 | X | 0 | 0 |
| 8 | 0 | 0 X | 0 X | X | X 0 | X 0 | 0 X | 0 X |
| 9 | X | X | X | X | 0 | X | 0 | 0 |
| 10 | 0 | 0 | 0 | 0 | 0 | X | 0 | 0 |

| INPUT PULSES | TRIGGERS | | | | | TUBES | | |
|---|---|---|---|---|---|---|---|---|
| | A | B | C | D | E | 10 | 11 | 12 |
| 0 | 0 | X | X | 0 | 0 | X | 0 | 0 |
| 1 | X | X | X | 0 | 0 | X | 0 | 0 |
| 2 | 0 | 0 | 0 | X | 0 | X | 0 | 0 |
| 3 | X | 0 | 0 | X | 0 | X | 0 | 0 |
| 4 | 0 | X | 0 | X | 0 | X | 0 | 0 |
| 5 | X | X | 0 | X | 0 | X | 0 | 0 |
| 6 | 0 | 0 | X | X | 0 | X | 0 | 0 |
| 7 | X | 0 | X | X | 0 | X | 0 | 0 |
| 8 | 0 | X | X | X | 0 | X | 0 | 0 |
| 9 | X | X | X | X | 0 | X | 0 | 0 |
| 10 | 0 | 0 X | 0 X | 0 | X 0 | X 0 | 0 X | 0 X |

Fig-4a-

INVENTOR
ARTHUR H. DICKINSON
BY Dwight D. Mooney
AGENT

INVENTOR
ARTHUR H. DICKINSON
BY Dwight D. Mooney
AGENT

Patented Apr. 29, 1952

2,594,742

UNITED STATES PATENT OFFICE 2,594,742

TWO SOURCE BINARY-DECADE COUNTER

Arthur H. Dickinson, Greenwich, Conn., assignor to International Business Machines Corporation, New York, N. Y., a corporation of New York Application January 12, 1949, Serial No. 70,496

8 Claims. (Cl. 250—27)

Figure 1:
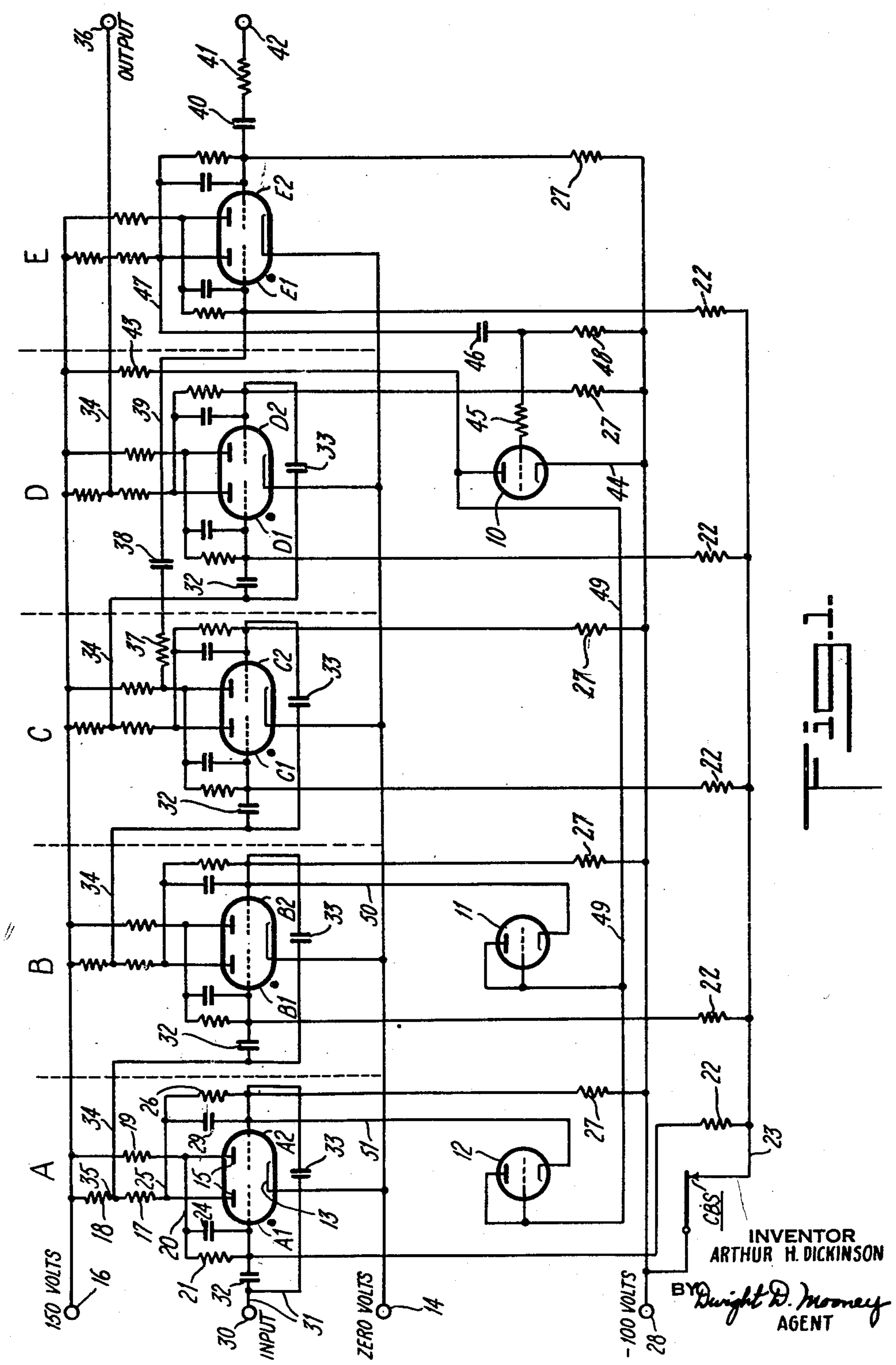

This invention relates to electronic counters and more particularly to a decade counter comprising a series chain of binary trigger circuits each having two tubes and two stable conditions.

In such counters various arrangements of feedback and tube blocking schemes have been employed in the past to convert from the binary system of counting to the decade system. These arrangements operate in response to a change in the stable condition of one of the triggers used to effect counting and produce, prevent or otherwise nullify change in the stable condition of at least one other trigger.

The use of such arrangements is hampered by the additional load placed on the triggers and the cumulative time lag in the operation of the triggers. To reduce this additional load and thereby effect an increase in the maximum operable speed of the counter necessitates the use of additional tubes for isolating the various triggers.

The cumulative time lag is of particular disadvantage when the counter is operated at high speed. This time lag in the operation of a particular trigger is proportional to its position in the series chain. Often, this time lag is so large that a change in the stable condition of certain triggers is not initiated until after subsequent pulses to be counted have been received in the counter. Since the counter cannot respond simultaneously to both the arrangement for converting from binary operation and the subsequent pulses to be counted a breakdown of counter operation occurs.

Accordingly, it is a principal object of this invention to provide a decade counter from a series chain of triggers wherein the above disadvantages are eliminated.

A broad object is to provide a novel circuit arrangement for converting an inherently binary counter into a decade counter.

It is another object to provide means for converting a counter from binary to decade operation which means are electrically isolated from the triggers of the counter except while actually effecting the conversion.

It is another object to convert a binary counter to a decade counter in response to pulses from a source of pulses independent of the source of pulses to be counted.

It is another object to provide a trigger circuit dissociated from the pulses to be counted and switchable from one stable condition to the other in response to a source of pulses having a higher repeat frequency than the pulses to be counted to effect the conduction of electron tubes for converting a binary counter to decade counting.

It is a further object to provide means, independent of the potentials of the triggers effecting counting, for converting a binary counter to a decade counter.

It is a further object to provide means for changing the stable condition of a counter independent of the time lag in the operation of the triggers of the counter.

It is a further object to provide a trigger switchable to one stable condition in response to a change in the stable condition of another trigger of the counter and switchable to another stable condition in response to a source dissociated from the counter to change the stable condition of the counter.

A still further object is to provide novel means for changing the stable condition of an electronic counter, said means being conditioned for switching by the counter and switched by means external thereto to effect a change in the stable condition of the counter.

Other objects of the invention will be pointed out in the following description and claims and illustrated in the accompanying drawings, which disclose, by way of examples, the principle of the invention and the best mode, which has been contemplated, of applying that principle.

Figure 2:
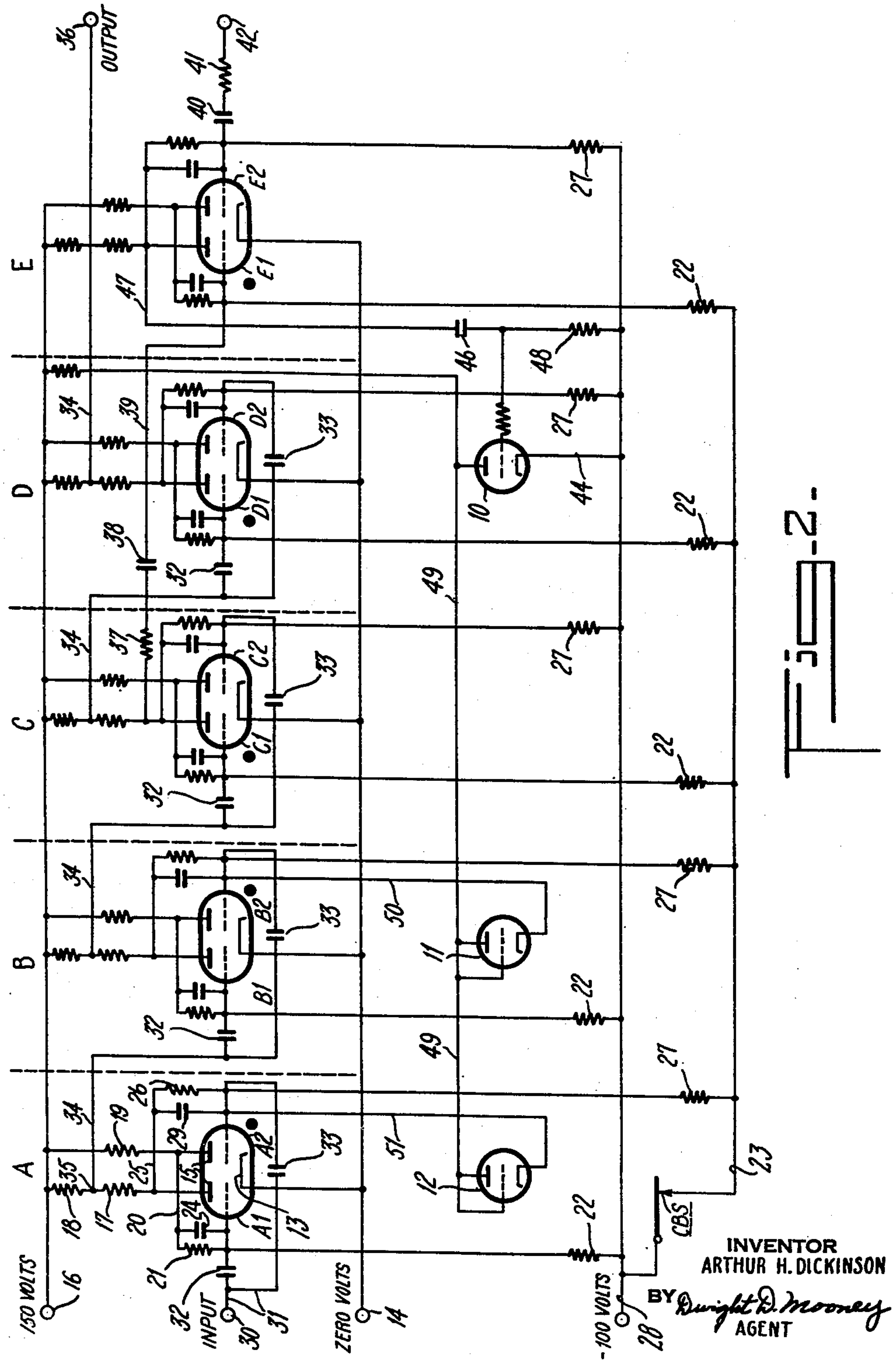

In the drawings:

Fig. 1 is a circuit diagram of an electronic counting circuit illustrating one embodiment of the invention;

Fig. 1*a* is a chart showing the stable condition of the component parts of the embodiment shown in Fig. 1 during a cycle of operation;

Fig. 2 is a circuit diagram of another embodiment of the invention;

Fig. 2*a* is a chart showing the stable condition of the component parts of the embodiment shown in Fig. 2 during a cycle of operation.

Figure 3:
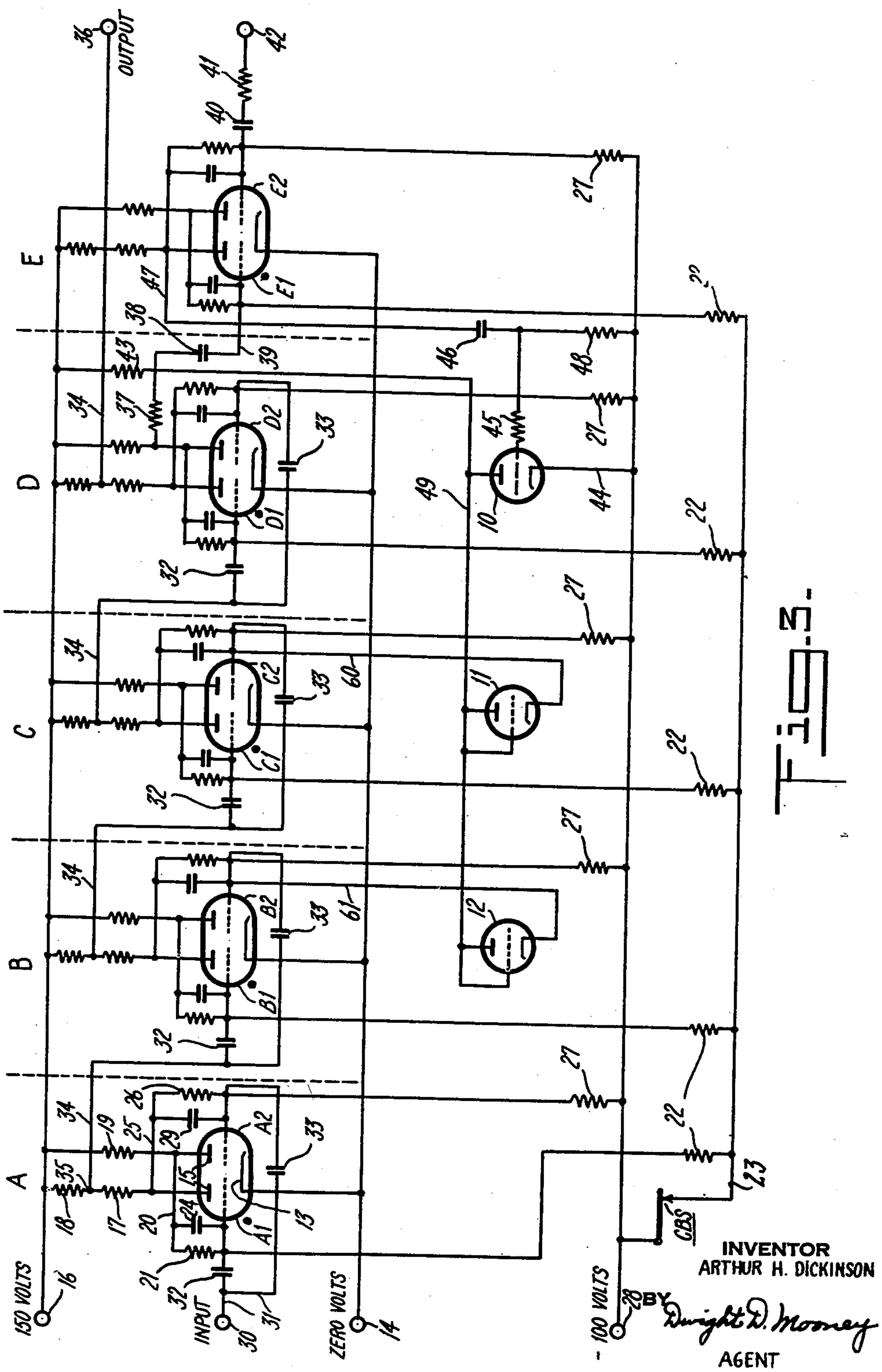
Figure 4:
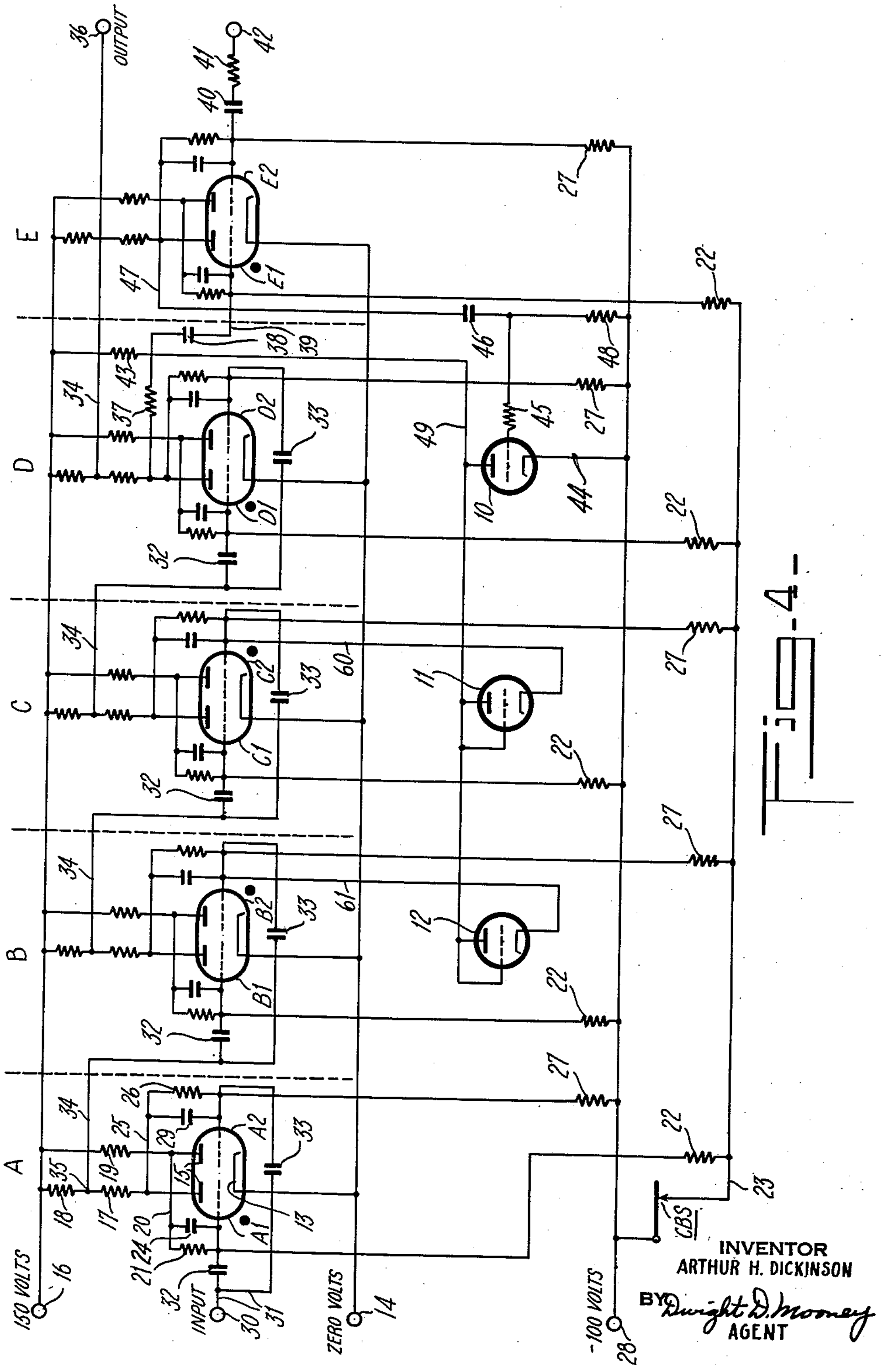

Fig. 3 is a circuit diagram of another embodiment of the invention;

Fig. 3*a* is a chart showing the stable condition of the component parts of the embodiment shown in Fig. 3 during a cycle of operation;

Fig. 4 is a circuit diagram of a further embodiment of the invention; and,

Fig. 4*a* is a chart showing the stable condition of the component parts of the embodiment shown in Fig. 4 during a cycle of operation.

Referring to the drawings and more particularly to Fig. 1, this embodiment of the novel counter comprises four trigger circuits A, B, C and D connected in cascade and shown for simplicity of illustration as divided by broken vertical lines. Another trigger circuit E and tubes 10, 11 and 12 comprise means for effecting a change in the stable condition of the counter. Each trigger includes two grid controlled tubes designated A1 and A2, B1 and B2, C1 and C2, D1 and D2 and E1 and E2, respectively. The tubes used are all of the same type and may, for example, be of the type having two tubes in a single envelope such as the 12SN7 type tube or if desired all tubes may be of the type having a single tube in an envelope.

Each trigger circuit A to E has two stable conditions which are assumed alternately, in one of which one tube is conductive and the other tube non-conductive and in the other condition the tubes have the reverse conductive conditions. These conditions are referred to herein as "on" and "off."

The "off" condition is assumed when the left-hand tube (A1, for example, of the trigger A) is conductive and the right-hand tube (A2) is non-conductive. The "on" condition is assumed when the right-hand tube is conductive and the left-hand tube is non-conductive.

Throughout the drawings a dot to the lower left or lower right of the trigger tubes indicates that the left or right trigger tube, respectively, as the case may be, is conductive when the counter is in the preselected starting condition.

In the initial or zero starting position of the counter of Fig. 1 each of the triggers A to E is in the "off" condition as indicated by the dot beside the conducting tubes A1, B1, C1, D1 and E1. The switching of any subsequent trigger from either condition to the other occurs when a negative pulse is applied simultaneously to the control grids of its tubes. Such negative pulses may be applied from an outside source or from a trigger prior to it in the series chain.

The trigger circuits are arranged so that the tubes of the trigger are non-responsive to positive pulses of equal amplitude to that of the negative pulses when the positive pulses are applied to the triggers as the negative pulses are applied. However, the triggers are responsive to positive pulses from the tubes 11 and 12 when those pulses are applied directly to the control grid of one tube of the trigger.

The arrangement and operation of the trigger circuit A will be described with reference to the values of applied voltage and the values of resistances and capacitances employed therein. These and other values are given hereinafter solely for the purpose of clarifying the explanation and it is to be specifically understood that they may be varied considerably without departing from the principles of the invention. The actual values are determined, among other things, by the upper and lower speeds of the entries to be counted.

The cathode 13 of tubes A1 and A2 is connected to a zero volt line 14 and plates 15 are connected to a +150 volt line 16, the plate of A1 being connected thereto through resistors 17 and 18 in series and the plate of A2 through a resistor 19, the combined value of the resistors 17 and 18 is equal to that of the resistor 19. Resistors 17, 18 and 19 are of 10,000 ohms, 10,000 ohms and 20,000 ohms, respectively. A lead 20 connects the plate of the tube A2 to the upper end of a voltage divider consisting of resistors 21 and 22, each of 200,000 ohms. The lower end of the divider is connected to a −100 volt cancel bias line 23. A capacitor 24 of 0.0001 microfarad shunts the resistor 21.

Similarly a lead 25 connects the plate of the tube A1 to the upper end of a voltage divider consisting of resistors 26 and 27, each of 200,000 ohms. The lower end of the divider is connected to a −100 volt bias line 28. As shown the cancel bias line 23 has a potential of −100 volts on it only when the cancel bias switch, CBS, joining the lines 23 and 28 is closed. A capacitor 29 of 0.0001 microfarad shunts the resistor 26.

Input terminal 30 is connected to the source of entries to be counted. These entries may comprise a series of negative pulses having characteristics suitable to effect a switching of the trigger circuit A. These negative pulses are applied via a lead 31 to the control grids of the tubes A1 and A2 through 32 and 33, respectively, each of 0.0001 microfarad. A trigger output lead 34 is connected at one end to a point 35 intermediate the load resistors 17 and 18 and at its other end to the input coupling capacitors 32 and 33 connected to the control grids of the tubes B1 and B2, respectively. The transfer of negative pulses from the trigger A over the lead 34 controls trigger B, i. e. determines whether B is in the "off" or "on" condition.

Since trigger A is in the "off" condition at the zero or starting time the tube A2 is biased to cutoff by the conduction of the tube A1, as is well known. As stated the triggers B, C, D and E are also in the "off" condition at the zero or starting time. The control grids of the tubes A1, B1, C1, D1 and E1 are connected to the cancel bias line 23, which provides for quick resetting to the preselected zero or starting condition given above.

To reset the circuit to the preselected starting condition the cancel bias line 23 is disconnected from its −100 volt supply, for example, by the opening of the switch CBS. When the switch CBS is opened the grid bias voltage applied to the tubes A1, B1, C1, D1 and E1 rises above the cutoff value and these tubes are rendered conductive irrespective of their condition immediately prior to the time when the switch CBS was opened.

A similar cancel bias system is provided for each embodiment of the invention and in each case the purpose served is the same, the particular changes being in the connections between the particular control grids of the chosen tubes and the cancel bias line, to determine different preselected starting conditions of the respective trigger circuits.

It should be observed that the tubes having their control grids connected to the cancel bias line 23 are conductive when the counter is in the zero or preselected starting position. The re-closing of the switch CBS does not remove the positive bias on the selected tubes but permits them to remain conductive until an entry changes the stable condition of the trigger. For example, when the switch CBS is reclosed, the control grid of the tube A1 is placed at a potential determined by the voltage divider comprising resistors 19, 21 and 22 connected between the lines 16 and 23 and is greater than the voltage required to render the tube A1 conductive.

As stated the triggers are responsive to negative pulses. Positive pulses having a value equal to that of the negative pulses will not effect a change in the stable condition of any trigger because the grid bias of the non-conducting tube is sufficiently below cutoff to prevent its conduction in response to the positive pulses. As an example, if such a positive pulse is applied to the grid of the tubes A1 and A2, when the trigger A is "off," it is not sufficient to cause the tube A2 to become conductive.

When the first negative pulse is applied to the control grids of the tubes A1 and A2 it has no direct effect on A2 since its control grid is already biased below cutoff. But, the first negative pulse causes the control grid of A1 to be biased below cutoff and the tube A1 is thereupon rendered non-conductive. The plate voltage of the tube A1 then rises toward that of the line 16. The increased voltage at the plate of the tube A1 is transferred from its plate to the control grid of the tube A2 through the parallel connected resistor 26 and capacitor 29. As a result, the control grid of the tube A2 is made sufficiently positive to render the tube A2 conductive. Because of this conduction the voltage at the plate of the tube A2 decreases. The decreased voltage is transferred to the control grid of the tube A1 through the parallel connected resistor 21 and capacitor 24 and maintains the tube A1 non-conductive. The tube A1 remains non-conductive and the tube A2 conductive until the next negative pulse is applied to the control grids of the trigger A. It is now obvious that the first negative pulse switches trigger A, as a whole, from the "off" condition to the "on" condition, the "off" condition, as set forth above, having been assumed as tube A1 becomes conductive and tube A2 non-conductive.

In a similar manner, the arrival of the second negative pulse renders the tube A2 non-conductive and the resulting rise in its plate voltage is transferred to the control grid of the tube A1 to permit that tube to become conductive and thereby hold the tube A2 in a non-conductive state. The decrease in the plate voltage of the tube A1 caused by its conduction is transferred to the control grid of the tube A2. It is to be particularly noted that this decrease in the plate voltage of the tube A1 is also transferred to the control grids of the tubes B1 and B2 via the output lead 34. This decrease, as explained for the trigger A, impressed simultaneously on the control grid of the conducting tube B1 and on the control grid of the non-conducting tube B2 causes the tube B1 to become non-conductive and the tube B2 to become conductive thereby placing the trigger circuit B in the "on" condition.

Now, that the cycle of trigger operation is understood, a description of the construction and operation of the novel counter will be undertaken.

The output of the trigger B is applied to the control grids of the trigger C and the output of the trigger C is applied to the control grids of the trigger D, in each instance the connection between the triggers is identical with that between the triggers A and B. The output lead 34 from the trigger D is connected to an output terminal 36, the output of the counter appearing between the terminal 36 and the zero volts line 14.

The plate of the tube C2 is connected to the control grid of the tube E1 through a resistor 37 of 50,000 ohms, a capacitor 38 of 0.0001 microfarad and a lead 39. The control grid of the tube E2 is connected through a capacitor 40 of 0.0001 microfarad and a resistor 41 of 100,000 ohms to a terminal 42 connected to any suitable source of negative pulses. The pulses from this source should be of proper shape and amplitude to effect a switching of the trigger E from the "on" to the "off" condition when applied to the control grid of the tube E2. Obviously, these pulses will not switch trigger E from "off" to "on" because terminal 42 is connected only to the control grid of the tube E2 which is non-conductive when the trigger E is "off." It is necessary that at least one pulse be applied to terminal 42 between each two consecutive pulses applied to input terminal 30. A simple way of insuring this is to have the frequency of the pulses applied to terminal 42 greater than that of the pulses to be counted which are applied to terminal 30.

As stated above the novel means for changing the counter from binary to decade operation includes the trigger E, tubes 10, 11 and 12 and the circuits associated therewith.

The plate of the tube 10 is connected to the +150 volt line 16 through a resistor 43 of 50,000 ohms and the cathode is connected to the −100 volt line 23 through a lead 44. The control grid of the tube 10 is connected to the plate of the tube E1 through a resistor 45 of 500,000 ohms, a capacitor 46 of 0.000001 mircrofarad and a lead 47 and to the −100 volt line 28 through a resistor 48 of 250,000 ohms. The tubes 11 and 12 each have their control grid connected to their plate and are therefore operated as diodes. The plates of the tubes 11 and 12 are connected to the plate of the tube 10 through a lead 49. The cathode of the tube 11 is connected to the control grid of the tube B2 through a lead 50 and the cathode of the tube 12 is connected to the control grid of the tube A2 through a lead 51.

When the counter is in the zero or starting condition, the tube E1 is in a state of substantially uniform conduction and no appreciable voltage change can be transferred from the plate of that tube to the control grid of the tube 10 through the capacitor 46. Hence, it is readily seen that the conductive condition of the tube 10 is unaffected by the tube E1 when the conductive state of the tube E1 is substantially uniform. During such time the conductive state of the tube 10 is determined by the voltage values applied to its electrodes. It now suffices to state that the tube 10 is conductive when the counter is in the zero or starting condition. Since the tube 10 is conductive, its plate voltage is low, this voltage is transferred to the plates of the tubes 11 and 12 over the lead 49 and is insufficient to allow them to conduct. This is so because the voltage applied to the plates of the tubes 11 and 12 which is the voltage present at the plate of the tube 10 is less than the voltage drop across the resistor 27 connected to the control grids of the tubes A2 and E2. Therefore at the zero or starting condition the tube 10 is conductive and the tubes 11 and 12 are non-conductive.

The description of one complete cycle of counter operation will be undertaken in connection with the circuit diagram of Fig. 1 and the chart of Fig. 1*a* wherein X indicates conduction of the tubes 10, 11 and 12 and the "on" condition of the triggers A, B, C, D and E and O indicates non-conduction of the tubes 10, 11 and 12 and the "off" condition of the triggers A, B, C, D and E. These same designations are used in Figs. 2*a*, 3*a* and 4*a* referred to hereinafter.

Fig. 1*a* illustrates that all triggers are in the "off" condition, the tube 10 conductive and the tubes 11 and 12 non-conductive when the counter is in the zero starting condition. As explained previously the first input pulse causes the trigger A to switch "on" and the second input pulse causes the trigger A to switch "off." This second switching of the trigger A causes the trigger B to switch "on."

The third pulse applied to the input terminal 30 causes the trigger A to switch "on." This switching of the trigger A has no effect on the stable condition of the trigger B since it is a positive pulse that is transferred from the plate of the non-conducting tube A1 over the lead 34 and the capacitors 32 and 33 to the control grids of the tubes B1 and B2.

The fourth pulse applied to the input terminal 30 causes the trigger A to switch "off." As a result a negative pulse is transferred over the lead 34 to the control grids of the tubes B1 and B2 thereby causing the trigger B to switch "off." When the trigger B switches "off" a negative pulse is transferred from the plate circuit of the conducting tube B1 over the lead 34 and the capacitor 32 and 33 respectively to the control grids of the tubes C1 and C2 to switch the trigger C to the "on" condition.

When the trigger C switches "on" the decreased voltage at the plate of the tube C2 caused by its conduction is transferred to the control grid of the tube E1 through the resistor 37, the capacitor 38 and the lead 39. This decreased voltage is sufficient to cause the trigger E to switch from the "off" to the "on" condition. When the trigger E switches "on" the tube E1 is rendered non-conductive and the increased voltage at its plate is transferred to the control grid of the tube 10 through the lead 47, the capacitor 46, and the resistor 45. But, since the tube 10 is conductive the increased voltage on its control grid has no substantial effect. Therefore, the changing of the stable condition of the circuit as a result of the application of the fourth pulse to be counted is brought to an end by the switching of the trigger E.

As previously pointed out a negative pulse of proper form and amplitude to effect a switching of the trigger E is applied to the terminal 42 before the application of the next pulse to be counted to the input terminal 30. This negative pulse applied to the terminal 42 causes the voltage on the control grid of the conducting tube E2 to be reduced below the cut off value and in accordance with the well-known trigger action the trigger E is switched to the "off" condition. The resulting conduction of the tube E1 causes a decreased voltage at its plate. As a result a negative pulse of sufficient value to render the tube 10 non-conductive is developed across the resistor 48. The increased voltage at the plate of the tube 10 is transferred to the plates of the tubes 11 and 12 through the lead 49. The tubes 11 and 12 are thus rendered conductive and current flows from the +150 volt line 16 through the resistor 43, the lead 49, the tubes 11 and 12 and the leads 50 and 51, respectively and the resistors 27 connected to the control grids of the tubes A2 and B2 to the −100 volt line 28.

The increased voltage drop across the resistors 27 caused by the current flow renders the control grids of the non-conductive tubes A2 and B2 sufficiently positive to initiate the switching of the triggers. As a result the triggers A and B are switched from the "off" to the "on" condition. The switching of the triggers A and B is equivalent to applying three pulses to be counted to the input terminal 30 and therefore effectively adds three counts in the counter. This adding of counts by the switching of triggers in response to the tubes 11 and 12 is referred to hereinafter as the production of or addition of artificial counts in the counter.

The fifth pulse applied to the input terminal 30 causes the trigger A to switch to the "off" condition. When the trigger A switches "off" a negative pulse is transferred through the lead 34 and capacitors 32 and 33, respectively to the control grids of the tubes B1 and B2 to switch the trigger B "off." In a like manner, a negative pulse is transferred from the plate circuit of the tube B1 to the control grids of the tubes C1 and C2 to switch the trigger C "off."

When the trigger C switches "off" a positive pulse is transferred from the plate of the non-conductive tube C2 through the resistor 37, the capacitor 38 and the lead 39 to the control grid of the tube E1. Because the tube E1 is conductive, this positive pulse applied to its control grid has no effect to change the stable condition of the trigger E. At the same time a negative pulse is transferred from the plate circuit of the tube C1 through the lead 34 and capacitors 32 and 33, respectively to the control grids of the tubes D1 and D2 and initiates the switching of the trigger D from the "off" to the "on" condition. When the trigger D switches "on," a positive pulse is transferred from the plate circuit of the tube D1 through the lead 34 to the terminal 36.

It should be noted that the tube 10 is conductive and the tubes 11 and 12 non-conductive. This is the same state that these tubes were in prior to the switching of the trigger E to the "off" condition in response to the negative pulse applied to the terminal 42 after the receipt of the fourth pulse to be counted and before the receipt of the fifth pulse to be counted. After the negative pulse from the terminal 42 has caused the switching described above and the effect of the pulse has ended the voltage on the control grid of the tube 10 will again assume its normal value and the tube 10 will become conductive. When the tube 10 becomes conductive the decreased voltage at its plate causes the voltage at the plates of the tubes 11 and 12 to be decreased sufficiently to render the tubes 11 and 12 non-conductive.

The sixth pulse applied to the input terminal 30 causes the trigger A to switch from the "off" to the "on" condition. As a result a positive pulse is transferred from the plate circuit of the tube A1 through the lead 34 and capacitors 32 and 33, respectively to the control grids of the tubes B1 and B2 and, for the reasons explained hereinbefore, has no effect on the stable condition of the trigger B.

The seventh pulse applied to the input terminal 30 causes the trigger A to switch from the "on" to the "off" condition. A negative pulse is transferred to the control grids of the tubes B1 and B2 and switches the trigger B from the "off" to the "on" condition. As a result a positive pulse is transferred to the control grids of the tubes C1 and C2 and is ineffective to switch the stable condition of the trigger C.

The eighth negative pulse applied to the input terminal 30 switches the trigger A from the "off" to the "on" condition. The resulting positive pulse applied to the control grids of the tubes B1 and B2 is ineffective to switch the stable condition of the trigger B.

The ninth negative pulse applied to the input terminal 30 switches the trigger A "off." The resulting negative pulse in the plate circuit of the tube A1 is transferred to the control grids of the tubes B1 and B2 and switches the trigger B "off." When the trigger B switches "off" the negative pulse in the plate circuit of the tube B1 is transferred to the control grids of the tubes C1 and C2 and switches the trigger C "on."

When the trigger C switches "on" a decreased voltage appears at the plate of the conducting tube C2. This decreased voltage is transferred through the resistor 37, the capacitor 38 and the lead 39 to the control grid of the conducting tube E1 and initiates the switching of the trigger E from the "off" to the "on" condition.

Before the tenth pulse is applied to the input terminal 30 a negative pulse is applied from the terminal 42 through the resistor 41 and the capacitor 40 to the control grid of the conducting tube E2. This causes the trigger E to switch from the "on" to the "off" condition. As explained in connection with the switching of this trigger to the "off" condition after receipt of the fourth input pulse the resulting decreased voltage at the plate of the tube E1 causes the tube 10 to become non-conductive. The resulting increased voltage at the plate of the tube 10 causes the tubes 11 and 12 to be rendered conductive and current flows from the +150 volt line 16 through the resistor 43, the lead 49, the tubes 11 and 12 and their respective cathode leads 50 and 51 and the resistors 27 connected to the control grids of the tubes A2 and B2 to the −100 volt line 28. This current flow raises the voltage on the control grids of the tubes sufficiently to initiate a switching of the triggers A and B. As a result of the increased voltage, the triggers are switched from the "off" to the "on" condition. This switching of the triggers A and B would require the application of three pulses to the input terminal 30 and, therefore, an artificial count of three is again added into the counter to complete the conversion from binary to decade counting.

When the effects of the pulse applied to the terminal 42 are ended the control grid of the tube 10 seeks its normal voltage and the tube 10 is rendered conductive. The decreased voltage at the plate of the tube 10 is transferred over the lead 49 to the plates of the tubes 11 and 12 and renders those tubes non-conductive. Hence, during the application of the tenth pulse to be counted the tube 10 is conductive and the tubes 11 and 12 non-conductive as shown in Fig. 1*a*.

The tenth pulse applied to the input terminal 30 switches trigger A from the "on" to the "off" condition. This switching of trigger A causes a negative pulse to be transferred from the plate circuit of the tube A to the control grids of the tubes B1 and B2 to switch the trigger B from the "on" to the "off" condition. In a like manner, the switching of trigger B causes a negative pulse to be transferred to the control grids of the tubes C1 and C2 to switch the trigger C from the "on" to the "off" condition.

When the trigger C switches "off" a positive pulse is transferred from the plate of the tube C2 to the control grid of the tube E1 but this pulse does not effect the stable condition of the trigger E because the tube E1 is already conductive. At the same time, a negative pulse is transferred from the plate circuit of the tube C1 to the control grids of the tubes D1 and D2 to switch the trigger D from the "on" to the "off" condition.

When the trigger D switches "off," a negative pulse is transferred from the plate circuit of the tube D1 through the lead 34 to the output terminal 36.

The counter repeats the above described cycle of operation for each ten pulses applied to the input terminal 30 so that in response to each tenth input pulse an output pulse is transferred to the output terminal 36.

Referring to Fig. 2 the counter comprises exactly the same circuit as shown in Fig. 1 except for the voltage bias connections to the control grids of the tubes of the triggers A, B, C, D and E. The control grids of the tubes A1 and B1 are each connected through a bias resistor 22 to the −100 volts line 28 and the control grids of the tubes C2, D2 and E2 are each connected through a bias resistor 27 to the line 28. The control grids of the tubes A2 and B2 are each connected through a bias resistor 27 to the cancel bias line 23 and the control grids of the tubes C1, D1 and E1 are each connected through a bias resistor 22 to the line 23. Hence, when the counter is in the zero or starting condition, ready to receive the first input pulse, the triggers A and B are "on," the triggers C, D and E "off," the tube 10 conductive and the tubes 11 and 12 non-conductive.

The above noted preselected starting condition of the triggers A to E inclusive is indicated on the drawing by a dot beside the conductive tubes A2, B2, C1, D1 and E1.

The first negative pulse applied to the input terminal 30 switches the trigger A "off." This switching of the trigger A causes the trigger B to switch "off" and the switching of the trigger B causes the trigger C to switch "on." A positive pulse is transferred through the resistor 37, the capacitor 38 and the lead 39 to the control grid of the tube E1 but has no effect on the stable condition of the trigger E because the tube E1 is already conductive.

The second negative pulse applied to the input terminal 30 switches the trigger A "on."

The third negative pulse applied to the input terminal 30 switches the trigger A "off." The switching of the trigger A causes the trigger B to switch "on."

The fourth negative pulse applied to the input terminal 30 switches the trigger A "on."

The fifth negative pulse applied to the input terminal 30 switches the trigger A "off." The switching of the trigger A causes the trigger B to switch "off" and the switching of the trigger B causes the trigger C to switch "off." The switching of the trigger C causes the trigger D to switch "on." When the trigger D switches a positive pulse is transferred through the lead 34 to the output terminal 36. The switching of the trigger C causes, also, a negative pulse to be transferred to the control grid of the conducting tube E1 and thereby switch the trigger E from the "off" to the "on" condition.

Before the next pulse to be counted is applied to the input terminal 30 a negative pulse is transferred through the resistor 41 and the capacitor 40 to the control grid of the conducting tube E2 to switch the trigger E back to the "off" condition. When this occurs the tube 10 is rendered non-conductive and the tubes 11 and 12 are rendered conductive in the manner explained in connection with the counter of Fig. 1 and the triggers A and B are switched "on." As soon as the effect of the pulse applied to the terminal 42 is ended the tube 10 returns to its conductive state and the tubes 11 and 12 to their non-conductive state. These tubes are shown to have thus returned when the sixth pulse is applied to the terminal 30.

The sixth pulse applied to the input terminal 30 switches the trigger A "off" and the switching of the trigger A causes the trigger B to switch "off." The switching of the trigger B causes the trigger C to switch "on."

The seventh pulse applied to the input terminal 30 switches the trigger A "on."

The eighth pulse applied to the input terminal 30 switches the trigger A "off" and the switching of the trigger A causes the trigger B to switch "on."

The ninth pulse applied to the input terminal 30 switches the trigger A "on."

The tenth pulse applied to the input terminal 30 switches the trigger A "off" and the switching of the trigger A causes the trigger B to switch "off." The switching of the trigger B causes the trigger C to switch "off." The switching of the trigger C causes the trigger D to switch "off" and a negative pulse to be transferred over the lead 34 to the output terminal 36. The switching of the trigger C causes, also, a negative pulse to be transferred to the control grid of the conducting tube E1 to switch the trigger E from the "off" to the "on" condition.

Before the next pulse is applied to the input terminal 32 a negative pulse is applied to the terminal 42 and transferred through the resistor 41 and the capacitor 40 to the control grid of the conducting tube E2 to switch the trigger E "off." When the trigger E switches "off," as described, hereinbefore, the tube 10 is rendered non-conductive and the tubes 11 and 12 conductive to switch the triggers A and B "on." When the effect of the pulse applied to the terminal 42 is ended the tube 10 again becomes conductive and the tubes 11 and 12 non-conductive to place the counter in the zero or starting condition.

Referring to Fig. 3, the triggers of the counter are identical with those of the counter shown in Fig. 1 and each is connected to be in the "off" condition at starting as are the triggers in Fig. 1. However, the plate of the tube D2 is connected through the resistor 37, the capacitor 38 and the conductor 39 to the control grid of the tube E1.

The cathode of the tube 11 is connected through a lead 60 to the control grid of the tube C2 and the cathode of the tube 12 is connected through a lead 61 to the control grid of the tube B2.

Referring to Fig. 3*a* it is seen that at the zero or starting condition the triggers A, B, C, D and E are "off," the tube 10 is conductive and the tubes 11 and 12 are non-conductive.

The first negative pulse applied to the input terminal 30 switches the trigger A "on."

The second negative pulse applied to the terminal 30 switches the trigger A "off" and the switching of the trigger A causes the trigger B to switch "on."

The third negative pulse applied to the terminal 30 switches the trigger A "on."

The fourth negative pulse applied to the terminal 30 switches the trigger A "off" and the switching of the trigger A causes the trigger B to switch "off." The switching of the trigger B causes the trigger C to switch "on."

The fifth negative pulse applied to the terminal 30 switches the trigger A "on."

The sixth negative pulse applied to the terminal 30 switches the trigger A "off" and the switching of the trigger A causes the trigger B to switch "on."

The seventh negative pulse applied to the terminal 30 switches the trigger A "on."

The eighth negative pulse applied to the terminal 30 switches the trigger A "off" and the switching of the trigger A causes the trigger B to switch "off." The switching of the trigger B causes the trigger C to switch "off" and the switching of the trigger C causes the trigger D to switch "on." When the trigger D switches "on" a negative pulse is transferred from the plate of the tube D2 through the resistor 37, the capacitor 38 and the conductor 39 to the control grid of the conductive tube E1 to switch the trigger E "on."

Before the next pulse to be counted is applied to the input terminal 30 a negative pulse is applied to the terminal 42 and transferred through the resistor 41 and the capacitor 40 to the control grid of the tube E2 to switch the trigger E to the "off" condition. As explained in connection with Fig. 1 the switching of the trigger E to the "off" condition causes a negative pulse to be applied to the control grid of the tube 10 and render that tube non-conductive.

The resulting increased voltage at the plate of the tube 10 causes the tubes 11 and 12 to become conductive. Current flow is established from the +150 volt line 16 through the resistor 43, the lead 49, the tubes 11 and 12 and their respective cathode leads 60 and 61 to the control grids of the tubes B2 and C2 and through the resistors 27 to the −100 volt line 28. This current flow causes the voltage at the control grids of the tubes B2 and C2 to increase and thereby effect a switching of the triggers B and C from the "off" to the "on" condition. When the effect of the pulse applied to the terminal 42 has ended the tube 10 again becomes conductive and the tubes 11 and 12 become non-conductive. These tubes are shown in this condition upon receipt of the ninth pulse.

The ninth pulse applied to the terminal 30 switches the trigger A "on."

The tenth pulse applied to the terminal 30 switches the trigger A "off" and the switching of the trigger A causes the trigger B to switch "off." The switching of the trigger B causes the trigger C to switch "off" and the switching of the trigger C causes the trigger D to switch "off" thereby placing the counter in the zero or starting condition and providing a negative pulse at the output terminal 42.

It should be noted that this counter converts from binary to decade counting in a single operation while retaining all of the advantages of the counters of Figures 2 and 3.

Referring to Fig. 4 the counter comprises the same components as that shown in Fig. 3. The difference in the circuit arrangement of the two figures is as pointed out below.

The control grids of the tubes A1, D1 and E1 are connected through the resistors 22 to the cancel bias line 23, the control grids of the tubes B1 and C1 being connected through the resistors 22 to the −100 volt line 28. The control grids of the tubes A2, D2 and E2 are connected through the resistors 27 to the −100 volt line 28 and the control grids of the tubes B2 and C2 are connected through the resistors 27 to the cancel bias line 23. Also, the control grid of the tube E1 is connected to the plate of the tube D1 instead of that of the tube D2. It is seen, therefore, that when the counter is in the zero or starting condition the triggers A, D and E are in the "off" condition and the triggers B and C are in the "on" condition. This preselected starting condition is indicated on the drawing by a dot beside each of the conductive tubes A1, B2, C2, D1 and E1.

This condition is shown by Fig. 4a in connection with which description of the counter operation will be undertaken. As in Fig. 3, before the first pulse to be counted is applied to the counter, the tube 10 is conductive and the tubes 11 and 12 are non-conductive.

The first negative pulse applied to the input terminal 30 switches the trigger A "on."

The second negative pulse applied to the terminal 30 switches the trigger A "off." The switching of the trigger A causes the trigger B to switch "off." The switching of the trigger B causes the trigger C to switch "off." The switching of the trigger C causes the trigger D to switch "on." When the trigger D switches "on" a positive pulse is transferred through the resistor 37, the capacitor 38 and the lead 39 to the control grid of the tube E1 but does not effect the stable condition of the trigger E because the tube E1 is already conductive. At the same time a positive pulse is transferred over the lead 34 to the output terminal 36.

The third negative pulse applied to the input terminal 30 switches the trigger A "on."

The fourth negative pulse applied to the terminal 30 switches the trigger A "off," this switching of the trigger A causes the trigger B to switch "on."

The fifth pulse applied to the terminal 30 switches the trigger A "on."

The sixth pulse applied to the input terminal 30 switches the trigger A "off." This causes the trigger B to switch "off" which causes the trigger C to switch "on."

The seventh pulse applied to the terminal 30 switches the trigger A "on."

The eighth pulse applied to the terminal 30 switches the trigger A "off" which causes the trigger B to switch "on."

The ninth pulse applied to the terminal 30 switches the trigger A "on."

The tenth pulse applied to the terminal A switches the trigger A "off" and the switching of the trigger A causes the trigger B to switch "off" which causes the trigger C to switch "off." The switching of the trigger C causes the trigger D to switch "off" which causes a negative pulse to be transferred from the plate of the tube D1 through the resistor 37, capacitor 38 and the conductor 39 to the control grid of the conductive tube E1 to switch the trigger E "on."

Before the next pulse is applied to the terminal 30 a negative pulse is applied to the terminal 42 and transferred to the control grid of the conductive tube E2 to switch the trigger E "off." As explained in connection with Fig. 1 this switching of the trigger E renders the tube 10 non-conductive which renders the tubes 11 and 12 conductive and thereby completes circuits therethrough to effect a switching of the triggers B and C to the "on" condition.

When the effect of the negative pulse applied to the terminal 42 has ended the tube 10 again becomes conductive and the tubes 11 and 12 non-conductive to place the counter in the zero or starting position.

It is now clear that each embodiment provides novel means, independent of the potentials of the triggers effecting counting and the time lag in the operation thereof, for converting the counter to decade counting. In each embodiment this means is conditioned by the counter to be responsive at a predetermined time in the cycle of counter operation and is rendered effective from a source external to the counter and source of pulses to be counted, to convert the counter to decade counting. In each instance this conversion takes place at a time when counting is not being effected by the counter.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. An electronic counter including a plurality of trigger circuits connected in a series chain for counting in the binary system, each trigger circuit having two stable conditions alternately assumed in response to successive voltage pulses applied thereto; input means connected to supply pulses to be counted to said chain; an electronic switch having a first and a second position and connected to be switched to said second position only in response to a pulse from said chain; tube circuit means connected to at least one of said trigger circuits and to said electronic switch, said tube circuit means being connected to be non-responsive to substantially constant voltages applied thereto but responsive to a voltage change transferred thereto from said electronic switch caused by its switching to said first position which switching causes an auxiliary pulse to be applied from said switch to said tube circuit means to effect a change in the stable condition of the trigger circuit connected thereto to produce artificial counts in said counter, the amplitude to said auxiliary pulse being independent of said input means.

2. An electronic counter including a plurality of electronic trigger circuits each with two stable conditions alternately assumed in response to voltage pulses applied thereto, said trigger circuits being connected in series chain for binary operation; a first source of pulses to be counted, said source being connected to the first trigger circuit in said chain; a second source of pulses supplying at least one pulse intermediate each two successive pulses from said first source; a conversion circuit connected to a selected one of said trigger circuits and effective when actuated to cause decade operation of said chain; and an additional trigger circuit connected to be responsive to an output of said chain to place it in one preselected stable condition and to pulses from said second source to actuate said conversion circuit.

3. In an electronic counter including five trigger circuits each having two conditions of stability alternately assumed in response to pulses applied thereto, the first four trigger circuits being connected in a series chain to effect counting of electrical pulses in the binary system; a first source of pulses to be counted; an output connection from one trigger circuit other than the last in the chain; means for placing said trigger circuits in a preselected starting condition; a connection from a lower trigger circuit in the chain to the last to switch the latter to one preselected condition of stability upon the former assuming one preselected condition of stability; a second source of pulses having a frequency higher than that of said first source; a connection from the second source to the last trigger circuit to switch the latter from said preselected condition of stability; a conversion circuit for converting said counter from binary to decade operation; a grid controlled tube connected to be responsive to the switching of the last trigger circuit from said preselected condition; and a connection from said grid controlled tube to said conversion circuit to energize the latter when the grid controlled tube is rendered responsive by switching of said last trigger circuit from said preselected condition of stability.

4. In an electronic system including a plurality of trigger circuits each having two grid controlled tubes and two stable conditions alternately assumed in response to pulses applied thereto, all said trigger circuits except one being connected in a series chain, a first source of pulses connected to energize said chain; means for advancing artificially the operation of the trigger circuits connected in said chain so that said trigger circuits effect decade counting of pulses from said first source, said means including a connection from one trigger circuit in the series chain to one tube of said one trigger circuit to change the one trigger circuit from one stable condition to the other, a second source of pulses supplying at least one pulse intermediate each two successive pulses from said first source, a connection from said second source to the other tube of said one trigger circuit to switch it to said one stable condition, a grid controlled tube connected to be responsive to the switching of said one trigger circuit to said one stable condition, and circuit means connecting said grid controlled tube to at least one of the trigger circuits connected in said chain to render said circuit means effective when said last trigger circuit is switched to said one stable condition thereby switching the trigger circuit connected to said grid controlled tube to one preselected stable condition.

5. A decade counter including four series connected inherently binary trigger circuits each having first and second grid controlled tubes and two stable conditions alternately assumed in response to pulses applied thereto, a first source of pulses to be counted, means for placing the trigger circuits in a preselected starting condition, first circuit means connected to apply said pulses to the first tube of the first trigger circuit to effect a switching of the trigger circuits in regular binary fashion, a fifth trigger circuit having first and second grid controlled tubes and two stable conditions alternately assumed, second circuit means for placing the fifth trigger circuit in a preselected starting condition, a connection including a capacitor from the third trigger circuit to the fifth trigger circuit to switch the latter from the preselected condition in cyclic fashion, a second source of pulses producing at least one pulse intermediate each two successive pulses from said first source, a connection from the second source to the fifth trigger circuit to switch the latter to the preselected starting condition, a grid controlled tube having its control grid connected to the first tube of the fifth trigger circuit to render said grid controlled tube non-conductive for a predetermined period when said fifth trigger circuit is switched to the preselected condition, and electron tubes each having their plate connected to the plate of said grid controlled tube and their cathode connected to the first and second trigger circuits respectively, to switch the stable condition of the first and second trigger circuits when the grid controlled tube is rendered non-conductive thereby converting the counter from binary to decade counting.

6. A counter including four inherently binary trigger circuits connected in series chain, each trigger circuit having first and second grid controlled tubes and two stable conditions alternately assumed; a connection from the plate of the first tube of each trigger circuit to the control grid of each of the tubes of the next higher trigger circuit, except the last in the chain; a first source of pulses to be counted, and a connection therefrom to the control grids of the tubes of the first trigger circuit; means for placing the trigger circuits in a preselected starting condition; an output connection from the plate circuit of the first tube of the fourth trigger circuit to transfer a pulse in response to each tenth pulse from said first source and circuit means for switching cyclically the stable condition of the first and second trigger circuits to effect decade counting of the pulses from said first source, said means including a fifth trigger circuit having first and second grid controlled tubes and two stable conditions alternately assumed; means for placing said fifth trigger circuit in a preselected starting condition of stability, a connection from the plate circuit of the second tube of the third trigger circuit to the control grid of the first tube of the fifth trigger circuit for switching the latter from the preselected starting condition of stability when said second tube is rendered non-conductive; a second source of pulses supplying at least one pulse intermediate each two successive pulses from said first source and a connection from said second source to the control grid of the second tube of the fifth trigger circuit to switch the latter to the preselected starting condition of stability; a grid controlled switch tube connected to be responsive to the latter switching of the fifth trigger circuit; a pair of electron tubes with their respective cathodes connected to the second tube of the first and second trigger circuits, respectively, and their plates connected to the plate of the grid controlled switch tube, said pair of tubes being connected to be responsive to the grid controlled switch tube to cause a pulse to appear on said output connection in response to each tenth pulse applied to the control grids of the tubes of the first trigger circuit.

7. A decade counter including four series connected inherently binary trigger circuits each having first and second grid controlled tubes and two stable conditions alternately assumed in response to pulses applied thereto, a first source of pulses to be counted, circuit means for placing the counter in a preselected starting condition, a connection for applying said pulses to the first tube of the first trigger circuit to effect a switching of the trigger circuits in regular binary fashion, a fifth trigger circuit having first and second grid controlled tubes and two stable conditions alternately assumed in response to pulses applied thereto, circuit means for placing the fifth trigger circuit in a preselected starting condition, a connection including a capacitor from the fourth trigger circuit to the fifth trigger circuit to switch the latter from the preselected condition in cyclic fashion, a second source of pulses supplying at least one pulse intermediate each two successive pulses from said first source, a connection from the second source to the fifth trigger circuit to switch the latter to the preselected condition, a grid controlled tube having its control grid connected to the first tube of the fifth trigger circuit to render said grid controlled tube non-conductive for a predetermined period when the said fifth trigger circuit is switched to the preselected condition, and tubes having their plates connected to the plate of the said grid controlled tube and their cathodes connected to the second and third trigger circuits, respectively, to switch the stable condition of the latter when the grid controlled tube is rendered non-conductive thereby converting the counter from binary to decade counting.

8. In a binary-decade counter employing a plurality of counting elements each having first and second stable conditions, means for placing said counter in a preselected starting condition, an electronic switch having first and second positions and connected to one said element to be switched to said second position each time said element is switched to said second stable condition, pulse means independent of said counting elements and connected to said electronic switch for switching it to its first stable condition, electron tube means having first and second stable conditions and connected to a different one of said elements to apply a voltage thereto to cause a change in its stable condition when said tube means is switched to its second stable condition, a capacitive connection from said electronic switch to said tube means to switch the latter to its second position after the former has switched to its first condition.

ARTHUR H. DICKINSON.

REFERENCES CITED

The following references are of record in the file of this patent:

UNITED STATES PATENTS

| Number | Name | Date |
|---|---|---|
| 2,410,156 | Flory | Oct. 29, 1946 |
| 2,420,516 | Bischoff | May 13, 1947 |

OTHER REFERENCES

RCA Review, vol. VII, No. 3, September 1946, "Electronic Counters" by Grosdoff.